United States Patent
Ku

(10) Patent No.: US 8,284,509 B2
(45) Date of Patent: Oct. 9, 2012

(54) VOICE COIL MOTOR

(75) Inventor: Ping-Han Ku, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 62 days.

(21) Appl. No.: 12/976,971

(22) Filed: Dec. 22, 2010

(65) Prior Publication Data

US 2012/0120511 A1 May 17, 2012

(30) Foreign Application Priority Data

Nov. 16, 2010 (TW) ................................ 99139283 A

(51) Int. Cl.
*G02B 7/02* (2006.01)
*G02B 15/14* (2006.01)
*H02K 41/03* (2006.01)

(52) U.S. Cl. ..... 359/824; 359/814; 359/696; 310/12.16; 310/12.24; 310/12.31; 310/14; 310/311

(58) Field of Classification Search .................. 359/811, 359/813, 814, 819, 823, 824, 694, 696–702; 310/10, 12.01, 12.16, 12.19, 12.24, 12.31–12.33, 310/13, 14, 17, 311; 369/44.14–44.16; 720/683; 348/374; 396/133
See application file for complete search history.

(56) References Cited

U.S. PATENT DOCUMENTS

| | | | | |
|---|---|---|---|---|
| 7,400,068 | B2 * | 7/2008 | Tseng | 310/12.16 |
| 7,576,455 | B2 * | 8/2009 | Ho et al. | 310/10 |
| 7,633,190 | B2 * | 12/2009 | Liu et al. | 310/15 |
| 7,830,626 | B2 * | 11/2010 | Ke | 359/819 |
| 7,851,952 | B2 * | 12/2010 | Liao | 310/12.16 |
| 7,893,568 | B2 * | 2/2011 | Huang | 310/12.16 |
| 2010/0270870 | A1 * | 10/2010 | Liao | 310/12.16 |
| 2011/0038066 | A1 * | 2/2011 | Huang | 359/824 |
| 2011/0241450 | A1 * | 10/2011 | Hsu | 310/12.16 |

* cited by examiner

*Primary Examiner* — Loha Ben
(74) *Attorney, Agent, or Firm* — Altis Law Group, Inc.

(57) ABSTRACT

A voice coil motor includes a stationary member, a moveable member, a base, and two guide posts. The stationary member includes a stationary frame and a number of magnets fixed on the stationary frame. The stationary frame defines a first receiving room. The moveable member is received in the first receiving room and includes a barrel holder and a coil. The barrel holder defines a second receiving room for receiving a lens barrel. The coil wraps around the barrel holder. Two through holes extend from a top surface to a bottom surface of the barrel holder. The base supports the stationary member and the moveable member. The guide posts are perpendicularly fixed on the base and pass through the through holes of the moveable member.

8 Claims, 3 Drawing Sheets

VOICE COIL MOTOR

BACKGROUND

1. Technical Field

The present disclosure relates to lens actuators, and particularly, to a voice coil motor for driving a lens barrel.

2. Description of Related Art

A voice coil motor is preferred for driving lenses in image capturing devices to achieve an auto-focus function of the image capturing device. A typical voice coil motor includes a moveable frame for accommodating a lens barrel with lenses therein, a coil wrapped around the moveable frame, a number of magnets, a stationary frame for fixing the magnets and accommodating the moveable frame, and a resilient plate interconnecting the stationary frame and the moveable frame. The resilient plate is configured for holding the moveable frame on the stationary frame.

When a current is applied to the coil, a magnetic force is produced between the magnets and the coil, and the moveable frame with the lens barrel moves upward relative to the stationary frame. When the current is cut off, the moveable frame with the lens barrel is reset to its original position under a resilient force applied by the resilient plate. However, during the movement of the moveable frame, the magnetic force must overcome the resilient force. This causes a large current and wastes electricity.

Therefore, it is desirable to provide a voice coil motor, which can overcome or at least alleviate the above-mentioned problems.

DETAILED DESCRIPTION

Figure 1:
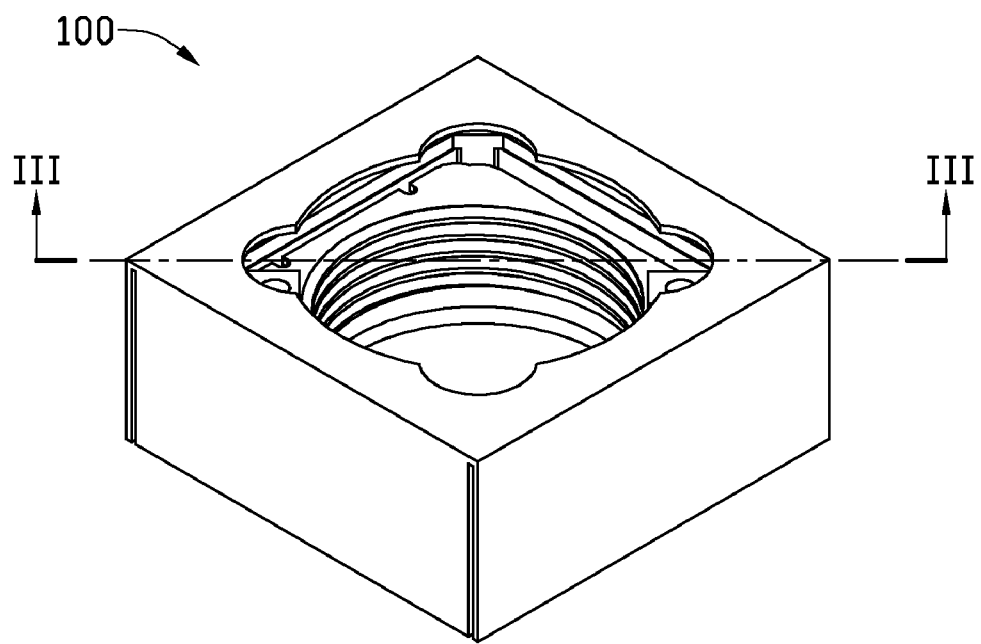
FIG. 1 is a schematic, isometric view of a voice coil motor, according to an exemplary embodiment.

Referring to FIG. 1, a voice coil motor 100, according to an exemplary embodiment, is shown. The voice coil motor 100 is used in image capturing devices, such as cameras, mobile phones, or digital videos, to drive a lens barrel (not shown) received therein.

Figure 2:
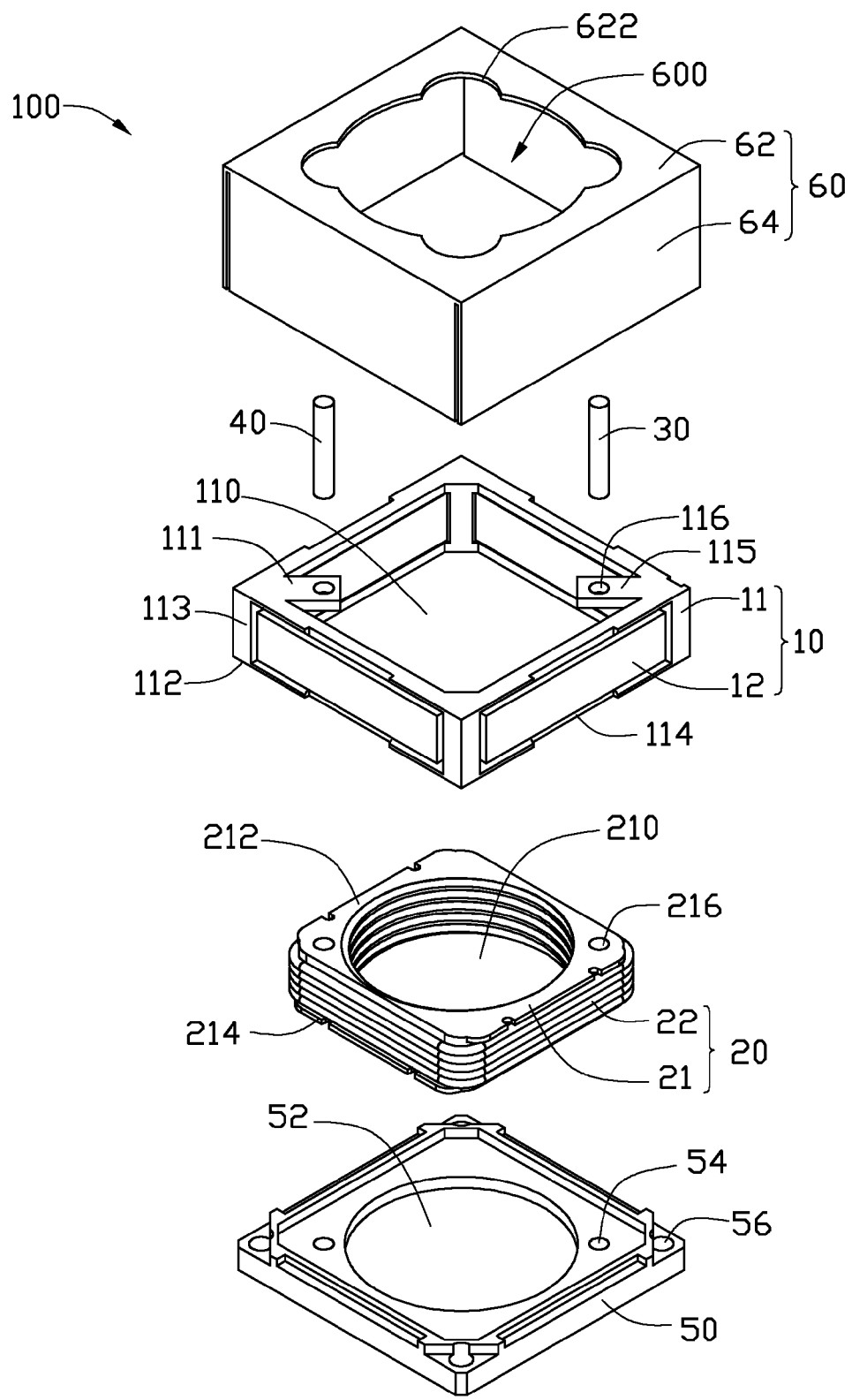
FIG. 2 is an exploded view of the voice coil motor of FIG. 1.
Figure 3:
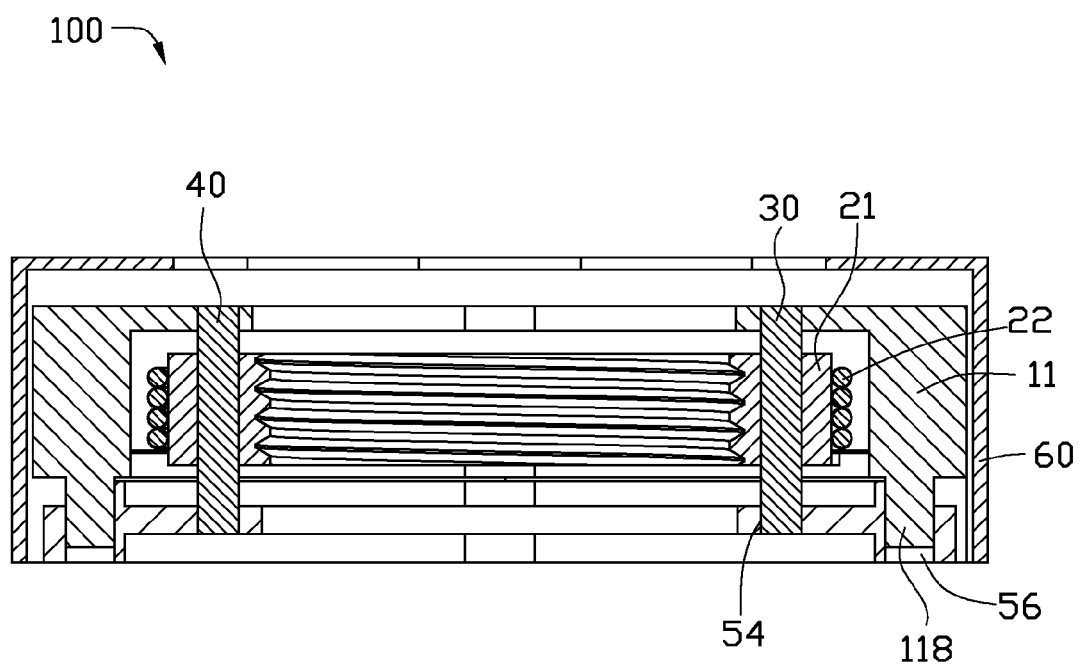
FIG. 3 is a sectional view taken along line of the voice coil motor of FIG. 1.

Referring to FIGS. 2-3, the voice coil motor 100 includes a stationary member 10, a moveable member 20, a first guide post 30, a second guide post 40, a base 50, and a housing 60.

The stationary member 10 includes a stationary frame 11 and four magnets 12. The stationary frame 11 is substantially a cube with an upper surface 111, a lower surface 112 opposite to the upper surface 111, and four sidewalls 113. The stationary frame 11 defines a first receiving room 110 for receiving the moveable member 20 and a first central axis (not shown). The four sidewalls 113 define four receiving spaces 114 for respectively receiving the magnets 12. The receiving spaces 114 are in communication with the first receiving room 110. Two protrusions 115 extend from two corners of the stationary frame 11 toward the first central axis in the first receiving room 110. A receiving hole 116 is defined in each protrusion 115. Four locating posts 118 perpendicularly extend from four corners of the lower surface 112. In this embodiment, the protrusions 115 are co-planar with the upper surface 111. The four magnets 12 are respectively fixed in the four receiving spaces 114.

The moveable member 20 includes a barrel holder 21 and a coil 22 wrapped around the barrel holder 21. The barrel holder 21 is substantially a cube and includes a top surface 212 and a bottom surface 214 at opposite sides of the barrel holder 21. The barrel holder 21 defines a second receiving room 210 and a second central axis (not shown) coinciding with the first central axis. The second receiving room 210 is configured for receiving a lens barrel (not shown), which contains at least one lens. Two through holes 216 are defined at two corners of the moveable member 20 and extend from the top surface 212 to the bottom surface 214 corresponding to the two receiving holes 116.

The base 50 is substantially a cube and defines a light incident hole 52 aligned with the first receiving room 110 and the second receiving room 210. The base 50 is coaxial with the stationary frame 11 and configured for supporting the stationary member 10, the moveable member 20, and the housing 60. The base 50 defines two fixing holes 54 around the light incident hole 52 and four recesses 56. The two fixing holes 54 are aligned with the two through holes 216. The four recesses 56 are positioned at four corners of the base 50 and are aligned with the four locating posts 118.

The first and second guide posts 30, 40 extend through the receiving holes 116, the through holes 216 and are fixed in the fixing holes 54.

The housing 60 includes a top panel 62 and four side panels 64 extending from four peripheral sides of the top panel 62. The top panel 62 and the side panels 64 cooperatively define a third receiving room 600 for receiving the stationary member 10, the moveable member 20, and the base 50. The top panel 62 defines an aperture 622 in a central portion thereof. The aperture 622 is aligned with the first receiving room 110, the second receiving room 210, and the light incident hole 52. The housing 60 is made of electromagnetic shielded material, such as nickel alloy, conductive plastic, surface conductive material, conductive glass, or other suitable shielding material. The housing 60 is configured for blocking contaminants such as dust and electromagnetic disturbance.

In assembly, the first and second guide posts 30, 40 are fixed in the fixing holes 54 by adhesive. The first and second guide posts 30, 40 extend through the through holes 216 of the moveable member 20 so that the moveable member 20 is supported by the base 50. The first and second guide posts 30, 40 extend through the receiving holes 116 and are attached to the stationary member 10 by adhesive, and the locating posts 118 are fixed in the recesses 56, thereby fixing the stationary member 10 on the base 50. The housing 60 covers the stationary member 10, the moveable member 20, and the base 50 and is supported on the upper surface 111 of the stationary frame 11.

When the voice coil motor 100 is in operation, a current is applied to the coil 22, a magnetic force is produced between the magnets 12 and the coil 22, and the moveable member 20 with the lens barrel moves forward along the first and second guide posts 30, 40 relative to the stationary member 10, thereby achieving an auto-focus function. If the current is cut off or a reverse current is applied to the coil 22, the moveable member 20 moves backward along the first and second guide posts 30, 40 and is reset to its original position. The voice coil motor 100 avoids producing resilient force, thereby saving electricity.

It is to be understood, however, that even though numerous characteristics and advantages of the present embodiments have been set fourth in the foregoing description, together with details of the structures and functions of the embodiments, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A voice coil motor comprising:
   a stationary member comprising a stationary frame and a plurality of magnets fixed on the stationary frame, the stationary frame defining a first receiving room;
   a moveable member received in the first receiving room, the moveable member comprising a barrel holder and a coil wrapped around the barrel holder, the barrel holder defining a second receiving room for receiving a lens barrel and two through holes extending from a top surface to a bottom surface of the barrel holder;
   a base configured for supporting the stationary member and the moveable member; and
   two guide posts perpendicularly fixed on the base and passing through the through holes of the moveable member, wherein one end of each guide post is fixed on the base, and the other end of each guide post is fixed on the stationary frame.

2. The voice coil motor as claimed in claim 1, wherein two fixing holes are defined in the base aligned with the through holes, and one end of each guide post is fixed in the corresponding fixing hole.

3. The voice coil motor as claimed in claim 2, wherein two protrusions extend from the stationary frame in the first receiving room, a receiving hole is defined in each protrusion aligned with a corresponding through hole, the other end of each guide post is fixed in the corresponding receiving hole.

4. The voice coil motor as claimed in claim 3, wherein the stationary frame comprises an upper surface and a lower surface opposite to the upper surface, the protrusions are flush with the upper surface, a plurality of locating posts perpendicularly extend from the bottom surface, and the base defines a plurality of recesses aligned with the respective locating posts.

5. The voice coil motor as claimed in claim 3, wherein four sidewalls of the stationary frame define four receiving spaces communicating with the first receiving room, and the magnets are fixed in the four receiving spaces, respectively.

6. The voice coil motor as claimed in claim 1, further comprising a housing, wherein the housing comprises a top panel and four side panels extending from four peripheral sides of the top panel, the top panel and the side panels cooperatively define a third receiving room for receiving the stationary member, the moveable member, and the base.

7. The voice coil motor as claimed in claim 6, wherein the housing is made of electromagnetic shielding material.

8. The voice coil motor as claimed in claim 6, wherein the housing is made of nickel alloy, conductive plastic, surface conductive material, or conductive glass.

* * * * *